United States Patent Office 2,770,635
Patented Nov. 13, 1956

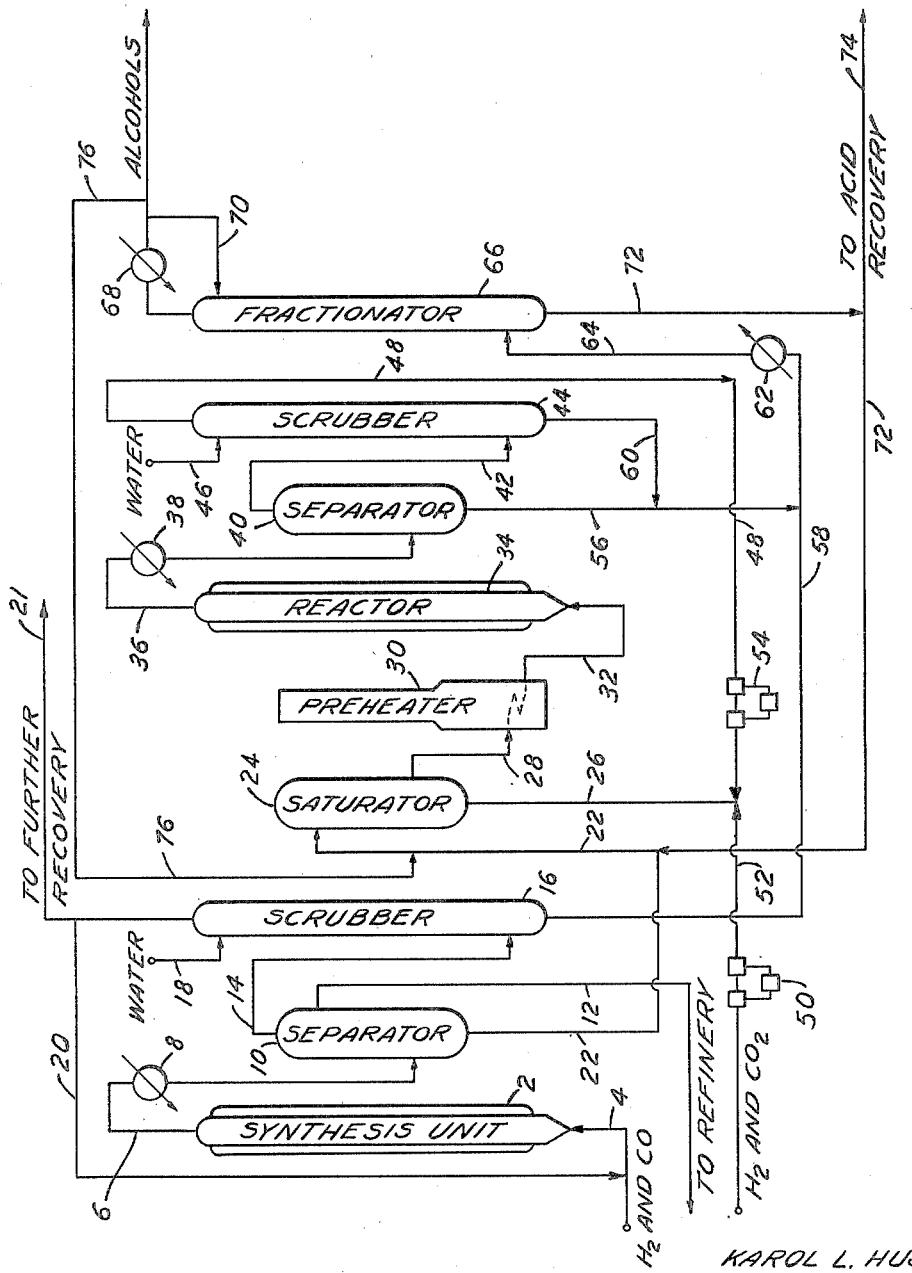

2,770,635

PRODUCTION OF ALCOHOLS AND ORGANIC ACIDS FROM OXYGENATED ORGANIC COMPOUNDS

Karol L. Hujsak and Richard Mungen, Tulsa, Okla., assignors to Stanolind Oil and Gas Company, Tulsa, Okla., a corporation of Delaware Application December 7, 1953, Serial No. 396,624

8 Claims. (Cl. 260—450)

Our invention relates to a novel method for increasing the concentration of alcohols and organic acids present in mixtures containing other oxygenated organic compounds. More particularly, it pertains to a method whereby alcohols and organic acids may be selectively obtained in increased ratio to the remaining classes of oxygenated organic compounds present in said mixtures.

Mixtures of oxygenated organic compounds of the type contemplated by our invention may be derived from any number of sources. Typical of such mixtures are those encountered in the oxidation of hydrocarbons where oil and aqueous phases are obtained, both of which contain oxygenated organic compounds. Another important source of such mixtures is the Fischer-Tropsch synthesis which, in addition to an oil layer containing oxygenated organic compounds, yields a water layer containing not only lower primary and secondary alcohols, but also various other oxygenated organic compounds including ketones, aldehydes and esters. While it is to be strictly understood that our invention is not limited to the utilization of mixtures of oxygenated organic compounds typical of those obtained in the Fischer-Tropsch synthesis, the present disclosure is based principally on the application of our invention to such mixtures.

In accordance with the now generally practiced modification of the Fischer-Tropsch synthesis, carbon monoxide and hydrogen in a ratio of about 1:2 are introduced into a suitable reactor at temperatures of from 260° to 370° C. and pressures of the order of 150 to 550 p. s. i. to produce a product mixture containing hydrocarbons, oxygenated organic compounds and water. Thereafter this mixture is further separated into a gas phase, a liquid hydrocarbon phase and a water phase. While this reaction is generally associated with the synthesis of hydrocarbons predominantly of the gasoline boiling range or the synthesis of hydrocarbons which can readily be converted into a fraction boiling in the aforesaid range, such reaction is likewise a very valuable source of aldehydes, ketones, acids and alcohols. This chemicals fraction may frequently constitute as much as 25 weight percent or more of the total, viz., hydrocarbons plus chemicals, and is generally found to be substantially equally distributed in the hydrocarbon or oil and water phases. The quantity of chemicals involved in a reaction of this type may be further appreciated when it is realized that the daily production of total chemicals from hydrocarbon synthesis plants now designed for commercial purposes is of the order of 500,000 pounds. However, the complexity of such chemical mixtures, even after they have been split into oil and water-soluble fractions, has apparently discouraged some of the principal workers in this field from attempting to isolate these materials in a substantially pure state. In the past a proposed solution to this problem consisted of recycling the water-soluble chemicals back to the synthesis unit where they were mixed with synthesis gas and converted predominantly to gasoline hydrocarbons. It was further proposed to remove the oil-soluble chemicals from the oil phase, for example, by extraction with a suitable solvent, separate the chemicals from the resulting extract and thereafter recycle them to the synthesis reactor where they were converted chiefly into gasoline hydrocarbons. If, on the other hand, it was desired to recover the oil and water-soluble chemicals fraction, this object was accomplished by means of a series of complicated chemical and physical separation steps. It will be apparent to those skilled in the art, however, that because of the extreme difficulty encountered in the separation of the complex chemical mixtures involved, viz., the separation of a single component from an azeotropic mixture in which the other components form azeotropes with one another as well as with the component which it is desired to isolate, any system capable of satisfactorily accomplishing this object will add many thousands of dollars to the total construction cost of a commercial plant.

It is therefore an object of our invention to provide a method whereby the composition of the water-soluble chemicals fraction, as well as the oil-soluble chemicals fraction—if desired—may be controlled, thus rendering our process extremely flexible and making possible the production of only those chemicals that are economically attractive at current market conditions. A further object of our invention is to provide a method by which a selected class or classes of chemicals may be continuously produced to the exclusion of hydrocarbon synthesis and other classes of chemicals present in the feed mixtures employed. A still further object of our invention is to provide a commercially practicable method by which alcohols or acids may be continuously produced from the remaining classes of chemicals present in the feed mixtures employed to the substantial exclusion of other undesired chemicals.

In our copending application U. S. Serial No. 101,986, filed June 29, 1949, we disclose a method whereby aqueous mixtures of oxygenated organic compounds of the type herein set forth may be converted in the presence of a suitable catalyst into ketones alone or into a mixture of ketones and acids by varying the temperatures and pressures to which said aqueous mixtures are subjected. Also, in our copending application U. S. Serial No. 101,987, filed June 29, 1949, now U. S. Patent No. 2,672,476, we teach a process whereby similar aqueous mixtures of oxygenated organic compounds may be selectively and separately converted in the presence of a suitable catalyst into ketones or alcohols or into a mixture of ketones and alcohols by varying the temperatures, pressures and hydrogen concentrations to which said aqueous mixtures are subjected. While both of the methods referred to above are in many respects relatively flexible insofar as concerns the classes of products and proportions thereof that may be obtained from the starting materials employed therein, neither of the aforesaid processes provides a means for producing from such mixtures organic acids alone. It will be apparent to those familiar with the art to which the present invention is directed that a method of the latter type is highly desirable in order to round out a series of processes capable of using a common starting material to produce a different end product or different combinations of end products to meet a wide range of market demands as well as other economic factors.

We have now discovered a process by which chemical mixtures of the type encountered in hydrocarbon synthesis may be converted in the pressence of a suitable catalyst into alcohols or acids. Broadly, our invention contemplates subjecting mixtures of oxygenated organic compounds of the general type obtained in the hydrocarbon synthesis water stream to the action of mixtures of hydrogen and carbon dioxide, in varying proportions, in the presence of a catalyst at temperatures and pressures which may—although not necessarily—fall within the ranges employed in the hydrocarbon synthesis, to produce alcohols or organic acids. In accordance with a preferred embodiment of our invention, the reaction mixture containing oxygenated organic compounds such as, for example, aldehydes, alcohols, acids and ketones, is introduced into a reactor of the general design employed in hydrocarbon synthesis where conversion occurs in the presence of a suitable fluidized hydrocarbon synthesis catalyst such as, for example, iron, at a temperature of from about 145° to about 360° C. and at pressures of from about 200 to 600 p. s. i., and above, in the presence of carbon dioxide and hydrogen. Thus, by treating a mixture of the aforesaid oxygenated organic compounds under the above-mentioned conditions of temperature and pressure in the presence of carbon dioxide, but in the substantial absence of hydrogen, i. e., less than about 10 mol percent of the hydrogen-carbon dioxide mixture, a marked increase is obtained in the acid content of the original feed mixture at the expense of aldehydes, ketones and alcohols. In general, the lower the hydrogen concentration of the reaction mixture, the more favorable are the conditions for the synthesis of acids. The concentration of carbon dioxide in reaction mixtures employed where maximum acid production is achieved is generally found to amount to from about 40 to 50 mol percent, or higher, whereas the concentration of hydrogen does not generally exceed 10 mol percent. If, on the other hand, greater quantities of alcohols are to be produced, the hydrogen partial pressure of the mixture should be increased to a value at which hydrogen and carbon dioxide are present in at least approximately equal molar ratios. When employing mixtures of hydrogen and carbon dioxide in carrying out the process of our invention, care should be exercised to avoid the use of hydrogen-carbon dioxide mixtures which favor the formation of substantial quantities of carbon monoxide—thereby promoting the occurrence of complicating side reactions. This undesirable condition may be obviated by utilizing hydrogen-carbon dioxide mixtures in which these materials are present in equilibrium concentrations with respect to the reaction:

$$H_2O + CO \rightleftharpoons CO_2 + H_2$$

where the carbon monoxide concentration in the system represented by the above equation does not exceed about 2 mol percent. In this connection, it is to be pointed out that although the conditions utilized, i. e., temperature, pressure and catalysts, may be substantially identical to those employed in ordinary hydrocarbon synthesis, no formation of hydrocarbons occurs in the process of our invention owing to the absence from the reaction mixture of hydrogen and carbon monoxide in synthesis proportions. By treating mixtures of chemicals of the type herein contemplated with a gaseous mixture containing approximately equal amounts of hydrogen and carbon dioxide at temperatures of between about 145° and about 360° C., preferably from about 250° to about 315° C. and at pressures of the order of 200 to 600 p. s. i., preferably 400 to 550 p. s. i., optimum yields of alcohols are secured with a corresponding decrease in the concentration of acids and ketones in the product mixture thus obtained.

The data appearing in Table I below serve further to point out the effect of temperatures and pressures on the respective amounts of carbon dioxide and hydrogen that may be employed to obtain an increase in the quantity of alcohols or acids produced from a typical feed stream:

TABLE I

| Minimum CO₂ Concentration Required to Obtain and Increase in Acids | | | Maximum CO₂ Concentration Tolerated to Obtain an Increase in Alcohols | | |
|---|---|---|---|---|---|
| Pressure, p. s. i. | Temperature, ° C. | CO₂:H₂ | Pressure, p. s. i. | Temperature, ° C. | CO₂:H₂ |
| 450 | 149 | 3:1 | 450 | 149 | 1:1 |
| 450 | 315 | 5:1 | 450 | 315 | 3:1 |
| 200 | 315 | 4:1 | 200 | 315 | 2:1 |
| 200 | 149 | 2:1 | 200 | 149 | 1:2 |

From the information appearing in Table I it will be apparent that at low temperatures and pressures relatively low ratios of carbon dioxide to hydrogen may be utilized to obtain an increase in the quantity of acids derived from the feed mixtures employed and with higher temperatures or pressures, or both, high ratios of carbon dioxide to hydrogen are necessary. Where an increase in alcohol concentration is desired, the ratio of carbon dioxide to hydrogen that can be tolerated is substantially directly proportional to the reaction temperature at a given pressure. We have further observed that for a given carbon dioxide and hydrogen concentration, at pressures, for example, below 450 p. s. i. and at temperatures of about 315° C., the yield of alcohols decreases mainly because less ketone is converted. At pressures above 450 p. s. i. and at the same temperature (315° C.), the yield of alcohols increases, chiefly because under such conditions aldehydes and acids are more completely converted. At a given carbon dioxide and hydrogen concentration and a given pressure, for example 450 p. s. i. and a temperature below 315° C., the yield of alcohols is increased. At the same pressure, but at a temperature above 315° C., the yield of alcohols is decreased and the acid yield is increased. Moreover, it has been our general observation that optimum increases in both alcohol and acid concentrations are secured when employing carbon dioxide-hydrogen mixtures which constitute from about 50 to about 67 mol percent of the total feed stream. Also, contrary to that which would normally be expected, we have found that under certain conditions of temperature, pressure and proportions of carbon dioxide and hydrogen relatively high percentages of acids are converted to alcohols. Thus, for example, from about 25 to about 60 percent of the acids present in feeds of the type contemplated herein may be converted to alcohols at conditions of temperature, pressure and carbon dioxide-hydrogen concentrations ranging from about 145° C., 200 p. s. i. and a carbon dioxide-hydrogen ratio of about 1:2 to about 315° C., 450 p. s. i. and a carbon dioxide-hydrogen ratio of about 3:1. At a given temperature and pressure, the quantity of acids converted to alcohols is found to vary with the concentration of carbon dioxide in the treating gas, while at a given carbon dioxide-hydrogen ratio the quantity of acids converted into alcohols increases with increasing temperature and pressure.

The composition of the feed mixture may vary widely; however, in the majority of instances where an increase in the concentration of alcohols is desired, the feed should contain at least 5 weight percent chemicals and at least 5 weight percent water. Where acids are the desired end product, no water need be present; however, as a practical matter, water may be present and its presence aids the formation of acids by suppressing ketone formation from the acids and by reaction with aldehydes in a manner similar to the reaction of aldehydes with carbon dioxide to form acids. On the other hand, if alcohols are to be produced, the initial presence of a small amount of water, i. e., about 5 weight percent, is considered desirable. In employing the process of our invention in conjunction with the hydrocarbon synthesis process, we have found it satisfactory to use feeds, viz., primary water (the aqueous phase in the original hydrocarbon synthesis product mixture) in which the chemicals (ketones, aldehydes, acids and alcohols) are present to the extent of from about 5 to 15 weight percent, usually about 7.5 weight percent. In general, the majority of chemicals present in the primary water comprise essentially acetaldehyde, ethanol, acetic acid and acetone, with smaller amounts of isopropyl alcohol, n-butanol, methyl propyl ketone, methyl ethyl ketone, propionic acid, etc. Such compounds present in smaller amounts are hereinafter referred to as "other chemicals." The composition of the feed mixture employed may be further varied by introducing into the feed mixture the still residue or overhead impurities obtained in separating the increased quantities of ketones or acids from the product mixtures obtained in accordance with the process of our invention. If desired, the feed composition may be varied by adding thereto substantially hydrocarbon-free mixtures of higher aldehydes, acids and alcohols derived from the oil-soluble fraction produced in hydrocarbon synthesis to obtain the alcohols or acids in increased concentration over that normally occurring in said water-soluble fraction. Additionally, we wish to point out that the primary hydrocarbon synthesis oil stream, either prior or subsequent to removal of the acids initially present therein, may be utilized as a suitable feed mixture in carrying out the process of our invention. The use of the primary oil as a feed mixture in our process we regard to be an especially outstanding contribution to a long-existing problem, i. e., the recovery of oil-soluble oxygenated chemicals in usable form from the synthesis oil. The concentration of such chemicals in the oil stream, including aldehydes, alcohols and ketones, is frequently found to constitute as much as 30 weight percent of the oil. By our invention these oxygenates can all be converted into acids, the acids subsequently neutralized and the resulting salts recovered, thus affording a convenient and efficient method for obtaining these otherwise difficultly-isolatable compounds.

With feed streams containing alcohols, ketones and aldehydes, the reactions involved when such mixtures are subjected to the action of carbon dioxide, under the conditions of the process of our invention, appear to be as indicated by the following equations, using ethanol, acetaldehyde and acetone as representative examples of their respective classes:

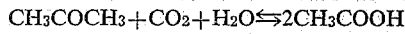

$$CH_3CH_2OH + 2CO_2 \rightleftharpoons CH_3COOH + H_2O + 2CO$$
$$CH_3CHO + CO_2 \rightleftharpoons CH_3COOH + CO$$
$$CH_3COCH_3 + CO_2 + H_2O \rightleftharpoons 2CH_3COOH$$

Thus, it may be seen that with feed mixtures in which alcohols and ketones are present in essentially the same molecular proportions, no additional water is necessary to convert all of the above-indicated classes of compounds to acids. Also, in instances where no ketones are present, alcohols and aldehydes may be converted to their corresponding acids in the absence of water other than that generated in the conversion of alcohols to acids.

The catalyst employed in effecting our invention may be any of those that have previously been shown to be capable of promoting hydrocarbon synthesis together with appreciable quantities of oxygenated hydrocarbons by means of the reduction of carbon monoxide with hydrogen. Typical of such catalysts are those mentioned in the recent publication of Storch et al., entitled The Fischer-Tropsch and Related Syntheses, published by John Wiley & Sons, Inc., New York, 1951. Among the hydrocarbon synthesis catalysts disclosed in the aforesaid reference are cobalt, nickel, ruthenium and iron. In fluidized bed operations, the catalyst is preferably employed in a state and under conditions such that the density of the catalyst bed ranges from about 65 to about 100 pounds per cubic foot and preferably 85 to 100 pounds per cubic foot in the case of iron. The catalyst is maintained in a fluidized state under the reaction conditions employed by introducing the feed mixture in vaporous form at a linear velocity of between about 0.1 and 2.0 feet per second. The concentration of catalyst employed in liquid phase processes may vary widely and, in general, will be determined by the activity of the particular catalyst employed. Thus, for example, with iron-type hydrocarbon synthesis catalysts, we prefer to use a concentration of approximately one pound of catalyst for each 0.2 to 0.5 mol of reaction mixture.

While the process of our invention referred to above and more specifically described below is disclosed generally in terms of vapor phase operation, it is to be strictly understood that we do not limit ourselves to such operating conditions, inasmuch as batch or continuous liquid phase operations may be advantageously employed with various combinations of feed mixtures, catalysts, reaction temperatures and pressures. Also, in carrying out our invention, the vapor phase conversion of oxygenated organic chemicals in accordance therewith may—if desired—be effected in reactors having fixed instead of fluidized catalyst beds.

Our invention may be further illustrated with reference to the production of increased amounts of alcohols from the other primary water chemicals by the accompanying drawing in which hydrogen and carbon monoxide in a molar ratio of about two mols of hydrogen to one mol of carbon monoxide are obtained from a source not shown and introduced into synthesis unit 2 through line 4. In synthesis unit 2 the reactants may be subjected to contact with a hydrocarbon synthesis catalyst such as, for example, iron mill scale in the form of a fluidized mass of finely-divided solid particles. The reaction is effected at temperatures of the order of 260° to 360° C. and at pressures in the range of 150 to 450 p. s. i. to yield a hydrocarbon phase and an aqueous phase. The products of the reaction are withdrawn from synthesis unit 2, through line 6 and condenser 8 into separator 10 where the liquid oil phase it withdrawn to the refinery through line 12 and the uncondensed gases containing unreacted synthesis gas and normally gaseous products of conversion—including ethane, methane, carbon dioxide, etc.—leave separator 10 through line 14 and are introduced into scrubber 16 where the gas phase is countercurrently contacted with water introduced at the top of the scrubber through line 18. Gases such as carbon monoxide, hydrogen, ethane, methane, carbon dioxide, etc., may—if desired—be partially recycled to feed line 4 via line 20, where they are mixed with fresh feed and introduced into synthesis unit 2. The balance of these products may be sent through line 21 to a suitable recovery system not shown where the gaseous components are recovered and further refined, if desired. The water layer from separator 10 is withdrawn through line 22 and transferred to saturator 24 where it is mixed with approximately equal molar quantities of hydrogen and carbon dioxide introduced through line 26. The conditions prevailing in saturator 24 are such that a vaporous mixture is obtained consisting essentially of 50 mol percent primary water and 50 mol percent of a hydrogen-carbon dioxide mixture containing these two components in approximately equal molar concentrations. To obtain vaporous mixtures of the aforesaid general composition in the saturator, temperatures varying from about 167° C. at 200 p. s. i. to about 212° C. at 550 p. s. i. should ordinarily be employed. After the mixture of primary water vapor, saturated with hydrogen and carbon dioxide, has been thus formed, it is withdrawn from saturator 24 through line 28 and introduced into preheater 30 where it is brought to reaction temperature, viz., 150° to 315° C., and thereafter introduced through line 32 into reactor 34 containing mill scale catalyst in fluidized form. Reactor 34 is preferably maintained at temperatures of from about 150° to about 315° C. and pressures of from 200 to 600 p. s. i. or higher. The product mixture is withdrawn from reactor 34 through line 36 and condenser 38 into separator 40 where the uncondensed products are withdrawn through line 42 and introduced into scrubber 44 where they are countercurrently contacted with water introduced at the top of scrubber 44 through line 46. The uncondensed gas phase issuing from scrubber 44 and which consists essentially of hydrogen and carbon dioxide is transferred through line 48 where it is mixed with make-up hydrogen and carbon dioxide pumped in at the desired pressure by means of compressor 50 through line 52. The recycle hydrogen and carbon dioxide are introduced under pressure via compressor 54 and line 26 where these gases are combined with make-up hydrogen and carbon dioxide and then introduced into saturator 24. The aqueous fraction in separator 40 containing water-soluble chemicals and having alcohols in increased ratio to the remaining chemical components thereof is withdrawn through line 56 and combined with scrubber water in lines 58 and 60 from scrubbers 16 and 44, respectively, after which the combined fractions are conducted through reboiler 62 and introduced by means of line 64 into fractionator 66 where separation of the acids from the alcohols may be effected. In this operation the alcohols together with various impurities, including aldehydes and ketones, may be taken off overhead through condenser 68 and a portion of the condensate returned through line 70 to the top of the column as reflux. Further purification of the alcohols present in the overhead fraction thus obtained by separation of the ketones and aldehydes therefrom may be effected in a known manner. The acids present in the mixture charged to fractionator 66 are withdrawn through lines 72 and 74 and refined. However, if it is desired to convert to alcohols the major portion of the chemicals present in the primary water stream, the acid fraction withdrawn from fractionator 66 through line 72 may be returned to saturator 24 via line 22. Also, impurities separated from the alcohols in the overhead fraction taken off through condenser 68 may be combined with the primary water in line 22 and thus be converted into acids. In the event acids are the desired end product of this conversion, the entire overhead fraction withdrawn from fractionator 66 through condenser 68 may be conducted through line 76, combined with the primary water in line 22 and thereafter be converted into acids in the manner indicated above. By the foregoing expedient, all of the chemicals present in the primary water stream may be converted into alcohols or acids, whichever is desired.

In the above-mentioned drawing reference to certain equipment such as pumps, gages, valves and the like which obviously would be necessary to operate the process has been intentionally omitted. Only sufficient equipment has been diagrammatically shown to illustrate the process, and it is intended that no undue limitation be read into our invention by reference to the drawing and description thereof.

Our invention may be further illustrated by the specific examples which follow:

*Example I*

A primary water stream from a hydrocarbon synthesis operation at 315° C. and 450 p. s. i. pressure having the following composition

| Component: | Mols |
|---|---|
| $CH_3CHO$ | .42 |
| $CH_3CH_2OH$ | 2.66 |
| $CH_3COOH$ | .75 |
| $H_2O$ | 92.93 |
| $CH_3COCH_3$ | .40 |
| Other chemicals | 2.84 | was mixed at 182° C. and 450 p. s. i. pressure with hydrogen and carbon dioxide in a ratio of one part of carbon dioxide and one part of hydrogen to one part of primary water, and the resulting vaporous mixture introduced into a conventional hydrocarbon synthesis type reactor where said mixture was brought into contact with a fluidized iron catalyst. The catalyst was maintained in a suspended turbulent state by introducing the reaction mixture at a linear velocity of about one foot per second. The temperature of the synthesis zone during the reaction was maintained at approximately 315° C., while the pressure was held at about 450 p. s. i. Analysis of the synthesis tail gas indicated a product mixture of the composition indicated below with a percentage gain in ethanol of 55 weight percent over that present in the original feed. The results from a similar run carried out with a primary water stream of the same composition and employing the same conditions of temperature and pressure but using no carbon dioxide, i. e., employing instead one part of hydrogen for each part of primary water, are likewise shown below for purposes of comparison.

TABLE II

| Components | Treatment with $H_2$ Alone | | | Treatment with $H_2$ and $CO_2$ | | |
|---|---|---|---|---|---|---|
| | Reaction Mixture, Mols | Product Mixture, Mols | Percent Gain | Reaction Mixture, Mols | Product Mixture, Mols | Percent Gain |
| $CH_3CHO$ | .21 | .080 | ------ | .14 | .12 | ------ |
| $CH_3CH_2OH$ | 1.33 | 1.47 | 10 | .88 | 1.36 | 55 |
| $CH_3COOH$ | .37 | .06 | ------ | .25 | .10 | ------ |
| $H_2O$ | 46.47 | 46.63 | ------ | 30.58 | 30.86 | ------ |
| $CH_3COCH_3$ | .20 | .35 | 75 | .13 | .002 | ------ |
| $H_2$ | 50.00 | 49.85 | ------ | 33.3 | 32.41 | ------ |
| $CO_2$ | 0 | .15 | ------ | 33.3 | 33.18 | ------ |
| Other chemicals | 1.42 | 1.42 | ------ | 1.42 | 1.42 | ------ |

From the above data it is apparent that by the use of hydrogen-carbon dioxide mixtures in accordance with the process of our invention a high degree of selectivity to alcohol conversion may be achieved in contrast to relatively low alcohol selectivity and high ketone selectivity obtained by treatment of the primary water with hydrogen alone under conditions which are otherwise identical. It should also be noted that in both instances, i. e., with hydrogen treatment alone and treatment with a mixture of hydrogen and carbon dioxide, the fraction in both the reaction and product mixtures designated as "other chemicals" did not change. In so far as total chemicals in this fraction are concerned, this is true; however, the proportion of alcohols and ketones in the first instance and the proportion of alcohols in the second instance was increased essentially by the same order of magnitude as was observed with ethanol and acetone in the first case and with ethanol in the second. It should be further noted that under the foregoing conditions of operation set forth in Example I, in which a mixture of both hydrogen and carbon dioxide was used as the treating gas, approximate 60 percent of the acetic acid in the feed was converted to ethanol.

*Example II*

A primary water stream from a hydrocarbon synthesis operation at 315° C. and 450 p. s. i. pressure was introduced into a suitable hydrogenation apparatus equipped with a multiple blade stirrer and containing an iron-type hydrocarbon synthesis catalyst. The temperature of the primary water was then brought to about 150° C. after which the pressure was increased to approximately 450 p. s. i. by the introduction of carbon dioxide into the reaction chamber. The resulting reaction mixture contained about one volume of carbon dioxide for each volume of primary water. The iron catalyst was employed in a concentration of approximately one pound of catalyst for each 0.2 to 0.5 mol of the reaction mixture. Under the conditions of temperature and pressure employed, the reaction mixture was partially vaporized. During the course of the reaction, sufficient carbon dioxide was introduced to maintain a pressure of approximately 450 p. s. i., while the reaction mixture was continuously agitated. When the reaction reached completion, the resulting mixture was withdrawn from the apparatus and analyzed. Analysis indicated a product mixture of the following composition with a gain in acetic acid of 400 weight percent over that present in the original feed as shown below:

TABLE III

| Component | Reaction Mixture, Mols | Product Mixture, Mols | Percent Gain |
|---|---|---|---|
| $CH_3CHO$ | .21 | .002 | |
| $CH_3CH_2OH$ | 1.33 | .45 | |
| $CH_3COOH$ | .37 | 1.85 | 400 |
| $H_2O$ | 46.47 | 45.18 | |
| $CH_3COCH_3$ | .20 | .01 | |
| $H_2$ | 0 | 1.98 | |
| $CO_2$ | 50.00 | 49.81 | |
| Other chemicals | 1.42 | 1.42 | |

From the data appearing above, it will be noted that although no hydrogen was initially present in the reaction mixture, approximately 2 mol percent was found to be present in the product mixture analyzed. It will be further noted that substantially all of the acetaldehyde and acetone and 66 percent of the ethanol were converted to acetic acid. By increasing the temperature of the reaction mixture to approximately 205° C. or by increasing the carbon dioxide concentration thereof to about 66 to 68 mol percent and employing the same temperature and pressure as first mentioned above in Example II, the reaction mixture will be completely vaporized, which would then permit the utilization of a fluidized system as taught in Example I. Either of the sets of conditions just mentioned will result in an increase in acid concentration at the expense of the aldehydes, alcohols and ketones present in the reaction mixture.

In order to demonstrate further the ability of the process of our invention to convert acids to alcohols under conditions varying over a relatively wide range, the following examples are included.

*Example III*

A primary water stream from a hydrocarbon synthesis operation at 315° C. and 450 p. s. i. pressure having the following composition Component: Mols
$CH_3CHO$ _____ .14
$CH_3CH_2OH$ _____ .88
$CH_3COOH$ _____ .25
$H_2O$ _____ 30.58
$CH_3COCH_3$ _____ .13
$H_2$ _____ 44.4
$CO_2$ _____ 22.2
Other chemicals _____ 1.42 was mixed at about 150° C. and 200 p. s. i. pressure with hydrogen and carbon dioxide in a ratio of one part of carbon dioxide and two parts of hydrogen to one part of primary water, and the resulting vaporous mixture introduced into a conventional hydrocarbon synthesis type reactor where said mixture was brought into contact with a fluidized iron catalyst. The catalyst was maintained in a suspended turbulent state by introducing the reaction mixture at a linear velocity of about one foot per second. The temperature of the synthesis zone during the reaction was maintained at approximately 150° C. while the pressure was held at about 200 p. s. i. Analysis of the synthesis tail gas indicated a product mixture of the composition appearing below with a percentage gain in ethanol of 17 weight percent over that present in the original feed. Also, in this regard, it should be noted that 28 percent of the acetic acid present was converted to ethanol, while 31 percent of the acetone was converted to the corresponding alcohol.

TABLE IV

| Component | Product Mixture, Mols | Percent Gain |
|---|---|---|
| $CH_3CHO$ | .13 | |
| $CH_3CH_2OH$ | 1.03 | 17 |
| $CH_3COOH$ | .18 | |
| $H_2O$ | 30.59 | |
| $CH_3COCH_3$ | .09 | |
| $H_2$ | 44.36 | |
| $CO_2$ | 22.20 | |
| Other chemicals | 1.42 | |

*Example IV*

A primary water stream from a hydrocarbon synthesis operation carried out under conditions similar to those recited in Example III was mixed, at a temperature of about 315° C. and 450 p. s. i. pressure, with a treating gas consisting essentially of carbon dioxide and hydrogen wherein the ratio of carbon dioxide to hydrogen was 3:1 and the proportion of treating gas to primary water was approximately 1:1. The resulting mixture was introduced into a conventional hydrocarbon synthesis reactor where it was brought into contact with a fluidized iron catalyst. The reaction conditions maintained throughout were essentially the same as those employed in Example I recited above. The composition of the reaction and product mixtures is indicated below:

TABLE V

| Component | Reaction Mixture, Mols | Product Mixture, Mols | Percent Gain |
|---|---|---|---|
| $CH_3CHO$ | .14 | .12 | |
| $CH_3CH_2OH$ | .88 | 1.10 | 23 |
| $CH_3COOH$ | .25 | .15 | |
| $H_2O$ | 30.58 | 30.59 | |
| $CH_3COCH_3$ | .13 | .10 | |
| $H_2$ | 44.4 | 44.34 | |
| $CO_2$ | 22.2 | 22.18 | |
| Other chemicals | 1.42 | 1.42 | |

Under the conditions of this example it is to be noted that approximately 40 percent of the acetic acid present was converted to ethanol, while about 23 percent of the acetone was converted to its corresponding alcohol.

From the foregoing it is clear that we have provided a process for substantially increasing the individual yields of alcohols and acids originally present in mixtures of the type herein set forth. Our invention further contemplates application of the principles specifically disclosed above to the treatment of any mixture of chemicals in which compounds of the classes taught herein are present and the source from which mixtures are derived is immaterial. In this connection, it is to be understood that the process of our invention is generally applicable to alcohols and acids, i. e., aliphatic, cycloaliphatic, aromatic and the like.

It will be apparent to those skilled in the art that numerous modifications in methods of processing, synthesis conditions and refining of the product mixtures may be employed without departing from the scope of our invention. For example, the acids initially present in the hydrocarbon synthesis primary water may be removed prior to reaction of the latter with hydrogen and carbon dioxide either by extraction or neutralization. Such a step preceding the treatment with carbon dioxide results in a greater quantity of aldehyde and alcohol being converted to acid in a single pass over the catalyst. By recycling all of the acid-free primary water over the catalyst, it is evident that the net products of the system will consist essentially of organic acids. In a similar manner the net products of the system will be found to consist essentially of alcohols if the impurities from the alcohol purification step are combined with the organic acids and returned to the saturator to react further with hydrogen and carbon dioxide as taught herein.

In general, it may be said that our invention covers a method for altering the concentration of one or more of the above-mentioned classes of compounds contained in a mixture thereof by treating said mixture with varying quantities of hydrogen and carbon dioxide under conditions such that the desired conversion is effected in the substantial absence of hydrocarbon synthesis.

This application is a continuation-in-part of our co-pending U. S. application Serial No. 101,988, filed June 29, 1949, now abandoned.

We claim:

1. A process for increasing the proportion of alcohols present in an aqueous mixture containing ketones and acids which comprises subjecting said mixtures to the action of a gas consisting essentially of hydrogen and carbon dioxide, the molar ratio of carbon dioxide to hydrogen ranging from not more than about 1:2 at a pressure of about 200 p. s. i. and a temperature of about 150° C. to not more than about 3:1 at a pressure of about 450 p. s. i. and a temperature of about 315° C., in the presence of a hydrocarbon synthesis catalyst but in the absence of hydrocarbon synthesis whereby ketones and at least about 25 weight percent of the acids are converted into alcohols, and thereafter recovering a mixture in which alcohols are present in increased ratio with respect to the remaining components of the mixture thus recovered.

2. A process for increasing the proportion of alcohols present in an aqueous mixture containing ketones and acids which comprises subjecting said mixture to the action of a gas consisting essentially of hydrogen and carbon dioxide, the molar concentration of hydrogen being at least equal to that of the carbon dioxide, in the presence of a hydrocarbon synthesis catalyst at pressures ranging upwardly from about 200 p. s. i. and temperatures of from about 145° to about 360° C. but in the absence of hydrocarbon synthesis, whereby ketones and at least about 25 weight percent of the acids are converted into alcohols, and thereafter recovering a mixture in which alcohols are present in increased ratio to the remaining components of the mixture thus recovered.

3. A process for increasing the proportion of one of the classes of oxygenated organic compounds selected from the group consisting of alcohols and acids present in a mixture of aldehydes and ketones, which comprises subjecting said mixture to the action of a gaseous mixture consisting essentially of hydrogen and carbon dioxide in the presence of a hydrocarbon synthesis catalyst, the minimum molar ratio of carbon dioxide to hydrogen being approximately within the range of conditions defined below, where an increase in the proportion of acids is desired:

| Pressure, p. s. i. | Temperature, ° C. | CO$_2$:H$_2$ |
|---|---|---|
| 450 | 150 | 3:1 |
| 450 | 315 | 5:1 |
| 200 | 315 | 4:1 |
| 200 | 150 | 2:1 | the maximum molar carbon dioxide-hydrogen ratio being approximately within the ranges of conditions defined below where an increase in the proportion of alcohols is desired:

| Pressure, p. s. i. | Temperature, ° C. | CO$_2$:H$_2$ |
|---|---|---|
| 450 | 150 | 1:1 |
| 450 | 315 | 3:1 |
| 200 | 315 | 2:1 |
| 200 | 150 | 1:2 | whereby aldehydes, ketones and at least about 25 weight percent of the acids are converted into alcohols, and thereafter recovering a mixture in which one of said oxygenated organic compounds selected from the group consisting of alcohols and acids is present in increased ratio to the other components of the mixture recovered.

4. A process for increasing the proportion of alcohols present in a mixture containing acids and a carbonyl compound selected from the group consisting of ketones and aldehydes which comprises subjecting said mixture to the action of a gas consisting essentially of hydrogen and carbon dioxide, the molar ratio of carbon dioxide to hydrogen ranging from 1:2 to about 3:1 in the presence of a hydrocarbon synthesis catalyst at pressures ranging from about 200 p. s. i. to about 450 p. s. i. and at a temperatures of from about 150° to about 315° C. but in the absence of hydrocarbon synthesis, whereby the carbonyl compound and from about 25 to about 60 weight percent of the acids are converted into alcohols, and thereafter recovering a mixture in which alcohols are present in increased ratio with respect to the remaining components of the mixture thus recovered.

5. The process of claim 4 in which an iron hydrocarbon synthesis catalyst is employed.

6. The process of claim 1 in which an iron hydrocarbon synthesis catalyst is employed and the aqueous mixture treated consists essentially of acetone, acetic acid and ethyl alcohol.

7. The process of claim 3 in which an iron hydrocarbon synthesis catalyst is employed.

8. In a process for increasing the proportion of acids present in a mixture of aldehydes and ketones; the steps which comprise subjecting said mixture to the action of a gas consisting essentially of hydrogen and carbon dioxide, the molar ratio of carbon dioxide to hydrogen ranging from about 2:1 at a pressure of about 200 p. s. i. and at a temperature of about 150° C. to not more than about 5:1 at a pressure of about 450 p. s. i. and a temperature of about 315° C., in the presence of an iron hydrocarbon synthesis catalyst but in the absence of hydrocarbon synthesis, whereby said aldehydes and ketones are at least partially converted into said acids, and thereafter recovering a mixture in which acids are present in increased ratio with respect to the remaining components of the mixture thus recovered.

References Cited in the file of this patent

UNITED STATES PATENTS

| 2,516,958 | Coley | Aug. 1, 1950 |
| 2,569,380 | Holder | Sept. 25, 1951 |

OTHER REFERENCES

Storch et al.: "The Fischer-Tropsch and Related Syntheses," John Wiley & Sons, Inc., New York (1951), pages 125 and 133.